United States Patent [19]

Summers

[11] Patent Number: 4,982,836
[45] Date of Patent: Jan. 8, 1991

[54] CONVEYOR BELT AND GUIDING SYSTEM THEREFOR

[75] Inventor: Roger L. Summers, Alliance, Ohio

[73] Assignee: Bridgestone/Firestone, Inc., Akron, Ohio

[21] Appl. No.: 366,114

[22] Filed: Jun. 14, 1989

[51] Int. Cl.⁵ .............................................. B65G 15/60
[52] U.S. Cl. .................................... 198/838; 198/845
[58] Field of Search ............... 198/845, 841, 842, 843, 198/838, 831

[56] References Cited

U.S. PATENT DOCUMENTS

| | | |
|---|---|---|
| 702,408 | 6/1902 | Cook . |
| 809,827 | 1/1906 | Lucas . |
| 1,026,617 | 5/1912 | Turnbull . |
| 1,708,357 | 4/1929 | Coil et al. . |
| 1,758,397 | 5/1930 | Harber . |
| 2,114,180 | 4/1938 | Guba .............................. 198/845 X |
| 2,558,832 | 7/1951 | Eriksson . |
| 2,694,484 | 11/1954 | Grebe . |
| 3,358,811 | 12/1967 | Gerrish .............................. 198/831 |
| 3,519,121 | 7/1970 | Baldwin et al. ............... 198/842 X |
| 3,881,592 | 5/1975 | Stimpson ........................ 198/845 X |
| 4,222,483 | 9/1980 | Wootton et al. ..................... 198/831 |
| 4,326,626 | 4/1982 | Brockwell .......................... 198/845 |
| 4,440,294 | 4/1984 | Langen ................................ 198/838 |

FOREIGN PATENT DOCUMENTS

| | | | |
|---|---|---|---|
| 573034 | 3/1959 | Canada ................................ 198/845 |
| 11751 | 8/1956 | Fed. Rep. of Germany ...... 198/845 |
| 1021788 | 12/1957 | Fed. Rep. of Germany ...... 198/845 |
| 542692 | 3/1977 | U.S.S.R. .............................. 198/845 |

Primary Examiner—Joseph J. Rolla
Assistant Examiner—D. Glenn Dayoan
Attorney, Agent, or Firm—Ronald Brietkrenz

[57] ABSTRACT

A conveyor of the type having a flexible endless belt with generally horizontal top and lower return levels is movably supported for delivering materials between load and unload stations. A plurality of transversely spaced pairs of wheeled trolleys or other types of slide mechanisms are movably mounted on spaced horizontal guide rails and are attached to opposite sides of the conveyor belt by brackets and small sections of flexible belt material. Each of the trolleys has a pair of horizontally mounted wheels and a pair of vertically mounted wheels which move with the conveyor belt along the guide rails to maintain accurate guidance and tracking of the conveyor belt. One of the trolleys of each pair is spring biased to compensate for possible variations in the guide rails.

19 Claims, 3 Drawing Sheets

CONVEYOR BELT AND GUIDING SYSTEM THEREFOR

BACKGROUND OF THE INVENTION

1. Technical Field

The invention relates to conveyor belts and in particular to an improved guiding system for mechanically maintaining a conveyor belt in accurate alignment without using the dynamics of the belt for guidance.

2. Background Information

Conveyor belts are used in many applications for transporting materials between load and unload stations. These conveyors consist of various types of flexible or rigid belts on which the material being conveyed is supported as the belt moves over a plurality of spaced rolls, slide plates, or other supporting structures located between the load and unload stations. Many conveyors use flexible endless belts formed of various fabrics which move around head and tail pulleys, one of which is power driven, and are supported on both the top delivery and bottom return levels of the belt by spaced rolls or slide plates which usually extend between side support structures.

It is desirable to maintain the belt in alignment between the adjacent supporting structures, such as vertical posts, to prevent the belt from wandering or moving transversely across the rolls or slide plates as the belt is driven in a longitudinal direction by the head pulley. One of the most common means of maintaining the belts in alignment is by using the dynamics of the belts themselves by engaging the moving belts with crowned pulleys, side guide rolls, or other mechanical mechanisms which engage the belt to maintain it in accurate alignment.

It is desirable for certain applications to accurately maintain the belt tracking so that the material being conveyed thereby is accurately delivered at the unload station. For example, in the transporting of various elastomeric strips of material in the manufacture of vehicle tires, air springs, and like articles, the strip material must be accurately delivered to a wind-up reel at the unload station. If the belt "wanders" or "walks" as it moves between the load and unload station, the strip material will be incorrectly wound on the wind-up reel, which when subsequently discharged, will provide inaccurate delivery of the required material strips used in the particular manufacturing process.

Thus, it is extremely critical for certain manufacturing operations that the conveyor accurately tracks or moves between the load and unload stations so that the material conveyed thereby is accurately delivered at the unload station. It has been found that by using the dynamics of the belt itself for guiding, it does not provide the desired accuracy for certain applications.

Prior art conveyors using various types of guiding systems are shown in the various patents discussed below.

U.S. Pat. No. 702,408 discloses a conveyor structure which has a trolley-track positioned in a frame which serves as a guide to trolley wheels to prevent lateral displacement of slats which form the supporting conveyor. The trolley is secured to every alternate bracket and two trolley wheels are pivotly mounted on chains.

U.S. Pat. No. 809,827 discloses a conveyor wherein generally U-shaped supporting elements are located on either side of the conveyor track. Rollers are positioned to facilitate movement of flexible material and are essentially separate elements from the conveyor material itself.

U.S. Pat. No. 1,026,617 discloses a conveyor comprising a plurality of slats to which rollers are attached on opposite sides thereof which then are attached via apertures on opposite sides of each of the slats.

U.S. Pat. No. 1,708,357 discloses a conveyor having a plurality of transversely extending sleeves which are movably supported on rolls by connecting links. The rolls move along horizontal tracks.

U.S. Pat. No. 1,758,397 discloses an endless conveyor wherein wheels move along parallel tracks and guides are secured to the tracks to keep the wheels aligned. Conveyor plates are mounted on chains, the ends of which are attached to links connected by pins to which the rollers or wheels are rotatably mounted.

U.S. Pat. No. 2,558,832 discloses a conveyor mechanism wherein rollers move on tracks, and in which brackets are attached to bars with rollers indirectly being attached to slats to facilitate movement of the conveyor, including such slats along the supporting structure.

U.S. Pat. No. 2,694,484 discloses an endless conveyor comprising plates on which rollers are attached by appropriate brackets.

Although the conveyor mechanisms and alignment features of the conveyors disclosed in the patents set forth above and in other known conveyor constructions do provide some solution to the conveyor belt alignment problem, none of these patents are believed to disclose a conveyor having a flexible belt with trolley wheels or other type of slide mechanism attached in a stationary fashion on one side of the belt and in a spring biased fashion on the other side of the belt, for maintaining accurate alignment or tracking of the conveyor belt as in my invention, which is described in detail below and set forth in the appended claims.

SUMMARY OF THE INVENTION

Objectives of the invention include providing an improved conveyor belt and in particular a conveyor belt guiding system which maintains accurate alignment or tracking of an endless flexible conveyor belt as it moves between load and unload stations by mechanical means attached directly to the belt without dynamically guiding the belt as in prior conveyor guidance systems.

A further objective of the invention is to provide such an improved conveyor belt in which wheeled trolleys or other type of slide mechanisms are attached to both sides of the conveyor belt and move along spaced parallel guide rails to maintain the belt in alignment; and in which one of the trolleys or slide mechanism is spring biased to compensate for any variations in the guide rails.

A still further objective of the invention is to provide such a conveyor belt in which each of the wheeled trolleys include two pairs of wheels, one pair of which supports a belt attachment bracket in a vertical plane and the other pair movably supports the belt attachment bracket in a horizontal plane to maintain alignment of the belt extending therebetween.

Another objective of the invention is to provide such an improved conveyor belt which is moved between the load and unload stations by usual power driven means, such as head and tail pulleys, and is supported by spaced, generally horizontal rolls or slide plates, wherein the improved guiding system mechanically guides the belt along its usual top and lower return levels of the conveyor.

A further objective of the invention is to provide such an improved conveyor belt in which the alignment trolleys or other slide mechanisms and brackets are connected at spaced locations along opposite longitudinal edges of the belt thereby not affecting the load carrying area of the belt or movement of the belt around its usual tail and head pulleys.

A still further objective of the invention is to provide such an improved conveyor belt and guiding system therefor which is formed of rugged and durable components, which can be adapted for use with usual conveyor belt materials, and which provides for accurate movement and alignment of the belt without relying on the dynamics of the belt as in prior alignment systems.

These objectives and advantages are obtained by the improved conveyor belt of the invention, the general nature of which may be stated as including an endless flexible conveyor belt; a pair of parallel guide rails extending along opposite longitudinal edges of the conveyor belt; slide means supported by and moveable along the guide rails; and bracket means for attaching the slide means to opposite edges of the conveyor belt to maintain accurate tracking of the conveyor belt as the belt moves longitudinally along and between the spaced rails.

BRIEF DESCRIPTION OF THE DRAWINGS

A preferred embodiment of the invention illustrative of the best mode in which applicant contemplates applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
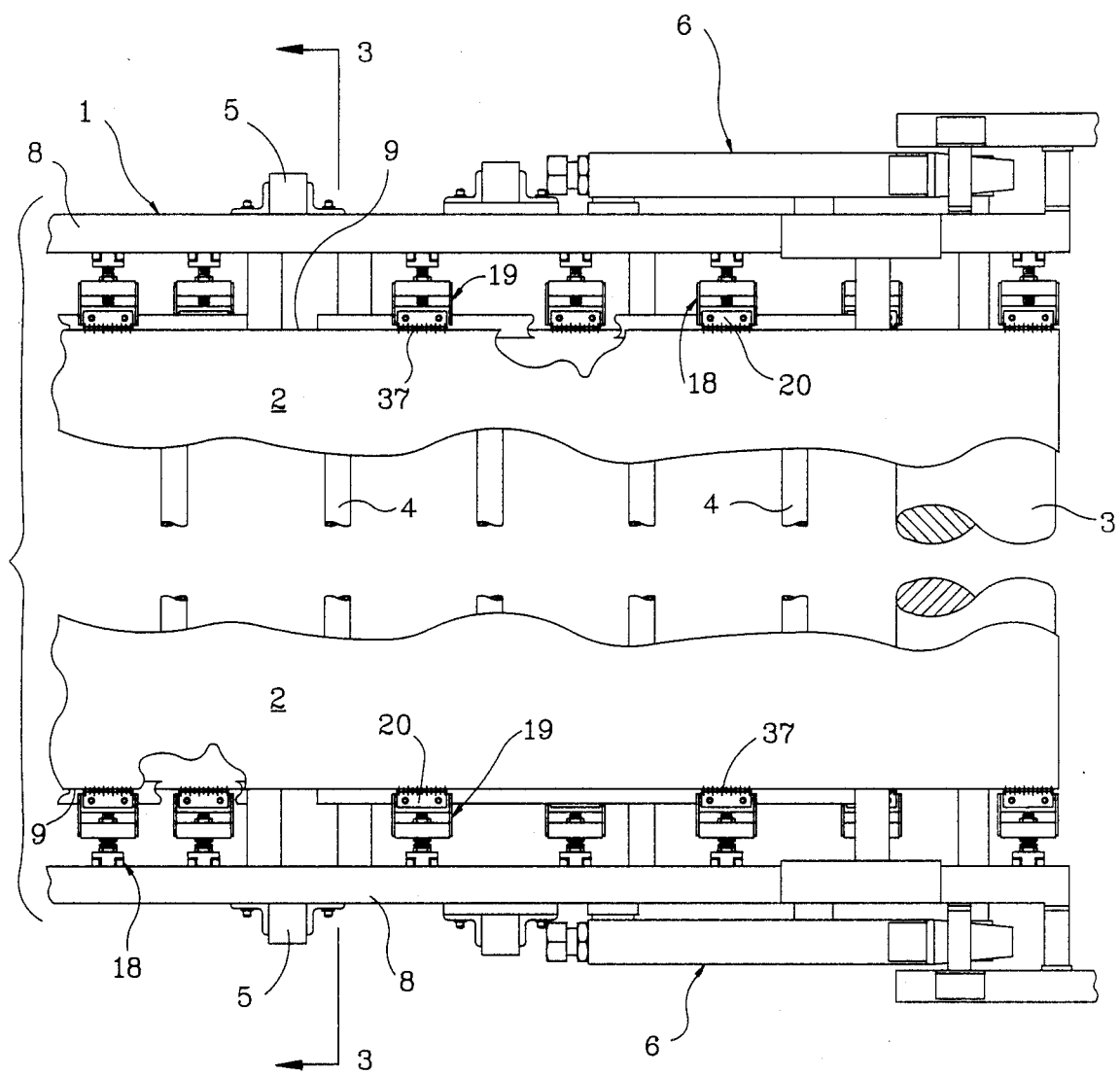
FIG. 1 is a generally diagrammatic fragmentary top plan view showing a portion of the improved conveyor belt and the guiding mechanism therefor.
Figure 2:
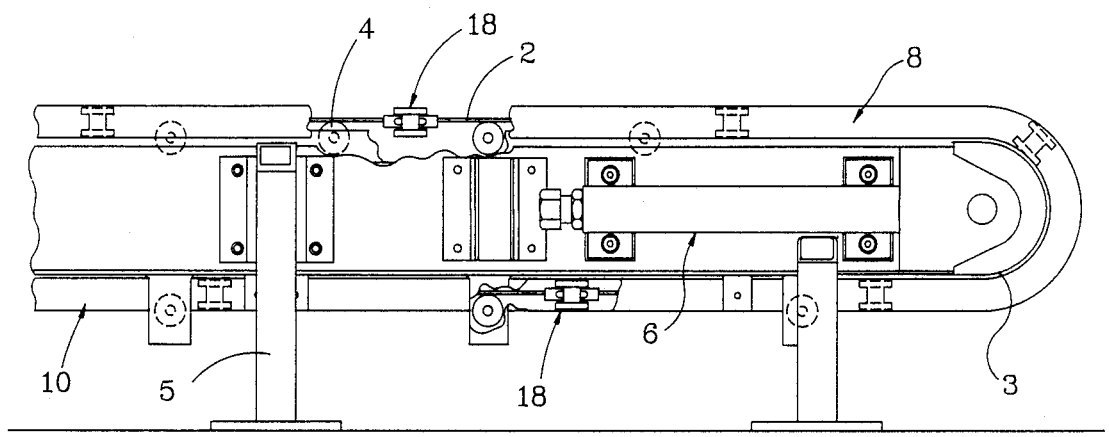
FIG. 2 is a generally diagrammatic side elevational view of the improved conveyor belt as shown in FIG. 1.
Figure 3:
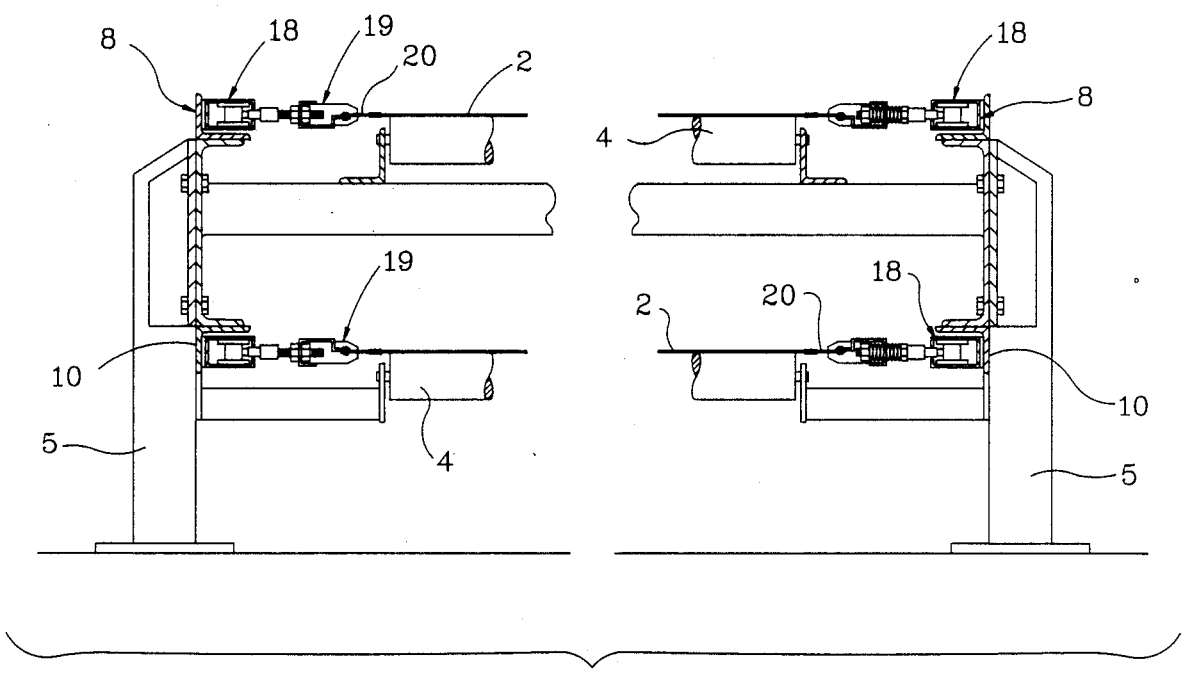
FIG. 3 is a generally diagrammatic fragmentary enlarged sectional view taken on line 3—3, FIG. 1.

The improved conveyor belt of the invention is indicated generally at 1, and is shown in fragmentary form in FIGS. 1-3. Conveyor 1 is of a usual construction in many respects in that it includes an endless conveyor belt 2 formed of a flexible material. Belt 2 extends about a driven head pulley (not shown) and a tail pulley 3 (FIG. 2) providing an upper generally horizontal load bearing level and a horizontal bottom return level. Conveyor belt 2 is movably supported on a plurality of horizontally extending and spaced rolls 4 which extend between and are mounted on a plurality of spaced, vertically extending support posts 5. Belt 2 may be adjustably mounted in the longitudinal direction by a tensioning mechanism indicated generally at 6 (FIGS. 1 and 2), which horizontally moves tail pulley 3 to compensate and adjust for belt stretch and to achieve the desired belt tension. If desired, for certain applications, conveyor belt 2 may be slidably supported on a plurality of horizontal slide plates (not shown) replacing the spaced horizontal rolls 4. The above description of conveyor belt 1 is standard for most conveyor mechanisms which use a flexible endless conveyor belt.

In accordance with the invention, a pair of horizontal guide rails indicated generally at 8, extend along longitudinal edges 9 of conveyor belt 2, preferably in a horizontal plane adjacent the top or load conveying level of the belt. A second pair of similar guide rails 10 extend horizontally along the longitudinal belt edges at the return level of the conveyor belt. Guide rails 8 and 10 are similar to each other, and thus only upper guide rails 8 are shown in detail in FIGS. 4 and 5. Each guide rail 8 preferably is a box-shaped or a square tube formed with spaced top and bottom walls 12 and 13, an outer vertical end wall 14 and spaced inner vertical wall 15. A longitudinal horizontally extending slotted opening 16 is formed in inner vertical wall 15.

A plurality of trolleys, each of which is indicated generally at 18, are movably mounted on and are supported by guide rails 8 and 10 for movably supporting a plurality of bracket assemblies, each of which is indicated generally at 19. Each bracket assembly 19 is connected to the edge of conveyor belt 2 by a short strip of flexible material 20, preferably formed of the same material as is belt 2.

Figure 4:
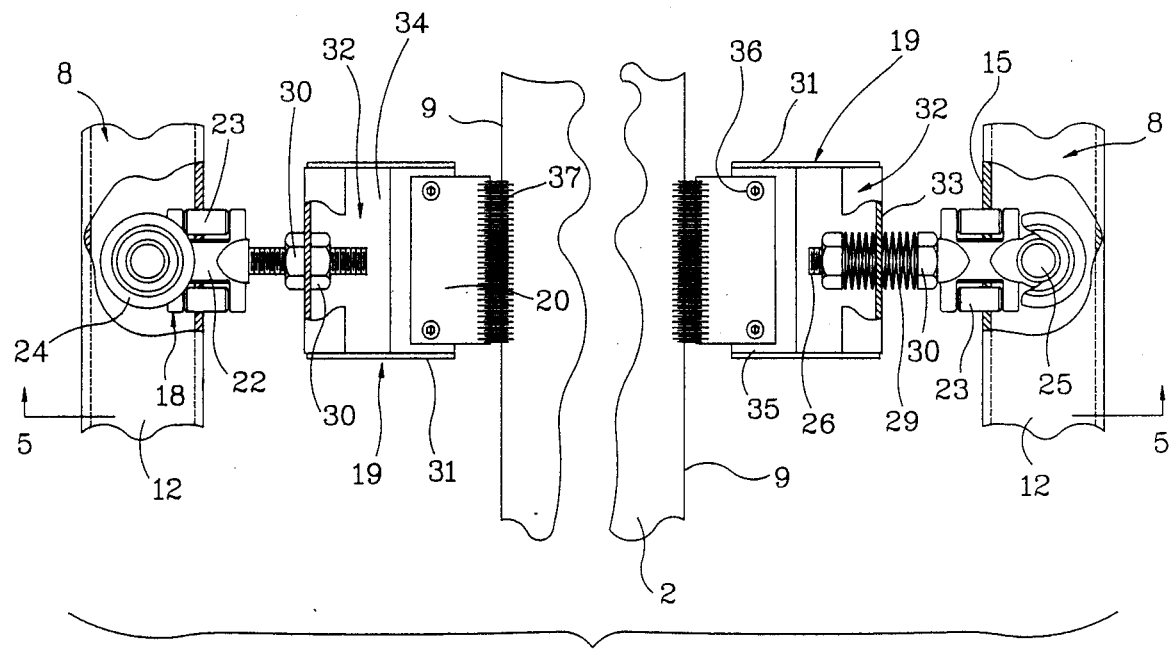
FIG. 4 is an enlarged fragmentary sectional view of one pair of opposed wheeled trolleys mounted on their associated guide rails.
Figure 5:
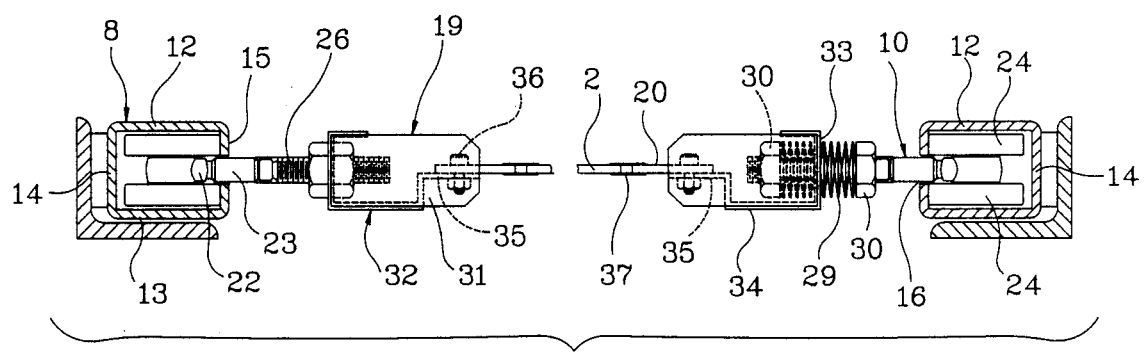
FIG. 5 is a fragmentary sectional view taken on line 5—5, FIG. 4.

Referring to FIGS. 4 and 5, each trolley 18 includes a generally H-shaped plate 22 on which is rotatably supported a pair of rollers 23 and a pair of spaced wheels 24. Wheels 24 are mounted on an axle 25 which extends perpendicularly outwardly from plate 22. A threaded shaft 26 extends inwardly from trolley plate 22 and adjustably mounts bracket assembly 19 thereon by a pair of nuts 30. Rollers 23 extend through slotted openings 16 of guide rails 8 and 10 and preferably engage and ride along the lower edges of openings 16. Wheels 24 ride along and engage the inner surfaces of vertical inner walls 15 of the guide rails (FIG. 5).

In accordance with another feature of the invention, one bracket assembly 19 of each pair of transversely opposed bracket assemblies, is mounted in a spring bias relationship on threaded shaft 26 by a plurality of stacked spring washers 29. Washers 29 are secured between nuts 30, two of which are used to fixedly attach the opposite bracket assembly 19 on shaft 26.

Each bracket assembly 19 includes a pair of side plates 31 and an intervening bracket plate indicated generally at 32. Plate 32 has a vertically extending rear wall portion 33 formed with an opening therein through which threaded shaft 26 extends, a horizontal bottom portion 34, and a stepped inner end 35. Flexible belt strip 20 is secured to stepped inner end 35 of each bracket plate 32 by a plurality of bolts 36. The other end of belt strip 20 is secured to the belt edges by stitching 37 or other types of attachment means.

The operation of the improved conveyor belt and in particular the guiding and alignment system thereof, is set forth below. A plurality of wheeled trolleys 18 are mounted in a transversely spaced relationship opposite of each other, and at spaced intervals longitudinally along the belt edges. Trolleys 18 are attached to bracket assemblies 19 which in turn are attached to the belt edges by stitching 37 as described above. Each wheeled trolley is movably mounted on its respective guide rail by engagement of rollers 23 and wheels 24 to maintain the attached bracket assembly 19 in vertical and horizontal alignment due to the engagement of the wheel and roller pairs of each trolley assembly with the associated vertical and horizontal portions of the guide rails as shown particularly in FIGS. 4 and 5 and described above. The spring bias action of spring washers 29 compensate for any variations in alignment of the guide rails throughout the length of the conveyor to achieve even greater alignment in tracking of the conveyor belt then would be obtained if both bracket assemblies were fixedly mounted with respect to the conveyor belt.

The conveyor belt is moved along its supporting rolls or slide plates in a usual manner with wheeled trolleys 18 and connected bracket assemblies 19 providing guidance and alignment of the belt without materially supporting the belt, since belt support is achieved by the supporting rolls and/or slide plates. However, the edges of the belt are maintained in accurate alignment along the conveyor path and are prevented from transverse movement or wandering across the supporting rolls by the attached bracket assemblies and wheel trolleys. The wheeled trolleys provide the support for the brackets and prevent movement of the brackets in both the horizontal and vertical directions due to the double pairs of wheels on each trolley. Furthermore, the flexible mounting of the belt to the brackets by flexible belt strips 20 permits conveyor belt 2 to move around the head and tail pulleys, as well as around other rolls or pulleys, during the movement of the belt between the load and unload stations. Threaded shaft 26 and bracket attachment nuts 30 permit the correct adjustment and alignment of the brackets on the trolleys, with other minor variations and misalignment of the spaced tracks being compensated for by the adjustable spring bias mounting of one of the bracket assemblies by spring washers 29.

Although the above description and drawings disclose the slide mechanism as being a wheeled trolley consisting of two pairs of support wheels, other types of slide mechanisms could be used for movably supporting the belt connecting brackets in the spaced side rails. For example, various types of slide blocks of various configurations could fit into or about the outside of complementary shaped guide rails and still provide movable support for the brackets which are attached to the belt, and can be formed of various materials providing a low friction sliding surface. For example, in certain applications the guide rails could be formed of plastic and the wheeled trolleys replaced with complementary shaped plastic slide blocks wherein the sliding friction between the plastic materials is relatively low, yet will provide the horizontal and vertical support for the slide mechanisms which will enable the belt connecting brackets to provide and maintain alignment of the belt as it moves longitudinally along the guide rails. Likewise, the slide mechanisms could be mounted on and extend about or within spherical shaped guide rails to provide the desired movable support for the belt brackets.

Accordingly the conveyor belt and guiding system therefor is simplified, provides an effective, safe, inexpensive, and efficient construction which achieves all the enumerated objective, provides for eliminating difficulties encountered with prior constructions, and solves problems and obtains new results in the art.

In the foregoing description, certain terms have been used for brevity, clearness and understanding; but no unnecessary limitation are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved conveyor belt and guiding system therefor is constructed and used, the characteristics of the construction, and the advantageous, new and useful results obtained; the new and useful structures, devices, elements, arrangements, parts and combinations, are set forth in the appended claims.

What is claimed:

1. An improved conveyor including:
   (a) an endless flexible conveyor belt extending between a head pulley and a tail pulley, one of which is power driven, for moving the conveyor belt in a linear longitudinal direction;
   (b) a pair of parallel guide rails extending along opposite longitudinal edges of the conveyor belt;
   (c) slide means supported by and moveable along the guide rails;
   (d) transversely spaced pairs of bracket means for attaching the slide means to opposite edges of the conveyor belt for moving the slide means along the guide rails; and
   (e) spring means mounted on only one of the bracket means of each pair of said bracket means for maintaining accurate tracking of the conveyor belt as the belt moves linearly longitudinally along and between the spaced rails.

2. The conveyor defined in claim 1 in which the slide means includes a plurality of transversely spaced pairs of slide mechanisms; and in which one of said slide mechanisms of each pair is movably mounted by the spring means to its bracket means for movably mounting said one slide mechanism in a spring biased relationship on its bracket means.

3. The conveyor defined in claim 1 in which the slide means is a plurality of spaced pairs of wheeled trolleys.

4. The conveyor defined in claim 3 in which the guide rails are similar, each being a box-shaped member having spaced top and bottom walls and inner and outer spaced side walls; in which the wheeled trolleys are contained generally within said box-shaped members; in which a longitudinally extending slotted opening is formed in each of the inner side walls; and in which roller means extend through the slotted openings for partially movably supporting the trolleys on the rails.

5. The conveyor defined in claim 3 in which each of the wheeled trolleys includes a pair of wheels and a pair of rollers for movably supporting the bracket means on the rails.

6. The conveyor defined in claim 5 in which the pair of wheels move along a substantially vertical portion of each of the guide rails; and in which the pair of rollers move along a substantially longitudinal horizontal portion of each of the guide rails.

7. The conveyor defined in claim 3 in which each of the bracket means is attached to the conveyor belt by a piece of flexible material.

8. The conveyor defined in claim 7 in which the flexible material is the same material as the conveyor belt.

9. The conveyor defined in claim 1 in which the bracket means includes a plurality of rigid brackets each having an attachment end for attaching to the conveyor belt and an end wall for attaching to the slide means.

10. The conveyor defined in claim 9 in which the end wall of each bracket extends generally perpendicular to a horizontal plane of the attachment end; and in which each of the slide means has a shaft which extends through an opening formed in the end wall for attaching said slide means to the bracket means.

11. The conveyor defined in claim 10 in which the spring means includes a plurality of spring washers mounted on the shaft and spring bias the slide means away from the bracket.

12. The conveyor defined in claim 3 in which at least one of the opposed trolleys has a mounting plate and a shaft for attaching the plate to the bracket means; and in which first and second pairs of wheel means are rotatably mounted on the plate, with the first pair being oriented 90° with respect to the second pair for movably supporting the plate with respect to the guide rail.

13. The conveyor defined in claim 12 in which the first pair of wheel means is a pair of rollers which supports the bracket means in a generally horizontal plane; and in which the second pair of wheel means is a pair of wheels which movably support the bracket means with respect to a generally vertical plane of the guide rails.

14. The conveyor defined in claim 13 in which the conveyor belt moves in a generally horizontal plane.

15. The conveyor defined in claim 3 in which each of the trolleys includes two pair of wheels, one pair horizontally movably supports the bracket means and the other pair vertically movably supports the bracket means with respect to the associated guide rail.

16. The conveyor defined in claim 1 including a plurality of spaced vertical support posts mounted along and adjacent to opposite longitudinal edges of the belt; in which the pair of parallel guide rails are mounted on the posts in a vertical spaced relationship from a second pair of parallel guide rails mounted on the posts; in which each of the pairs of the guide rails is located adjacent a top and return level respectively of the conveyor belt; and in which the belt extends generally horizontally between said guide rails.

17. The conveyor defined in claim 1 in which the conveyor belt is movably supported on a plurality of spaced rolls extending horizontally beneath the top and return levels of said belt.

18. An improved conveyor including:
(a) an endless flexible conveyor belt;
(b) a pair of parallel guide rails extending along opposite longitudinal edges of the conveyor belt, said guide rails each being a box-shaped member having spaced top and bottom walls and inner and outer spaced side walls with a longitudinally extending slotted opening being formed in each of the inner side walls;
(c) a plurality of spaced pair of wheeled trolleys contained generally within the box-shaped guide rail member and supported by and moveable along the guide rails, with the wheeled trolleys having roller means extending through the slotted openings for partially movably supporting said trolleys on the rails;
(d) bracket means for attaching the wheeled trolleys to opposite edges of the conveyor belt and
(e) spring means mounted on only one of the bracket means of each pair of said bracket means to maintain accurate tracking of the conveyor belt as the belt moves longitudinally along and between the spaced rails.

19. An improved conveyor including:
(a) an endless flexible conveyor belt;
(b) a pair of parallel guide rails extending along opposite longitudinal edges of the conveyor belt;
(c) slide means supported by and moveable along each of the guide rails, each of said slide means having a shaft;
(d) bracket means for attaching the slide means to opposite edges of the conveyor belt to maintain accurate tracking of the conveyor belt as the belt moves longitudinally along and between the space rails, said bracket means including a plurality of rigid brackets each having an attachment end for attaching to the conveyor belt and an end wall for attaching to the slide means, said end wall being formed with an opening through which the slide means shaft extends for attaching the slide means to the bracket means; and
(e) a plurality of spring washers mounted on the slide means shaft biasing the slide means away from the bracket.

* * * * *